(12) United States Patent
Barello et al.

(10) Patent No.: US 12,277,127 B2
(45) Date of Patent: *Apr. 15, 2025

(54) TASK AND PROCESS MINING BY ROBOTIC PROCESS AUTOMATIONS ACROSS A COMPUTING ENVIRONMENT

(71) Applicant: UiPath, Inc., New York, NY (US)

(72) Inventors: Gregory Barello, Eugene, WA (US);
Charles Park, Seattle, WA (US);
Prashanth Dannamaneni, Seattle, WA (US)

(73) Assignee: UiPath, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/585,707

(22) Filed: Feb. 23, 2024

(65) Prior Publication Data
US 2024/0193169 A1   Jun. 13, 2024

Related U.S. Application Data

(63) Continuation of application No. 17/229,085, filed on Apr. 13, 2021, now Pat. No. 11,934,416.

(51) Int. Cl.
*G06F 16/2458* (2019.01)
*B25J 9/16* (2006.01)
(Continued)

(52) U.S. Cl.
CPC .......... *G06F 16/2465* (2019.01); *B25J 9/161* (2013.01); *B25J 9/163* (2013.01); *B25J 9/1661* (2013.01);
(Continued)

(58) Field of Classification Search
CPC ............ G06F 16/2465; G06F 16/2458; G06F 16/285; G06F 16/283
(Continued)

(56) References Cited

U.S. PATENT DOCUMENTS

| 8,346,770 B2 | 1/2013 | Smith et al. |
|---|---|---|
| 8,402,026 B2 | 3/2013 | Gallivan |

(Continued)

FOREIGN PATENT DOCUMENTS

| EP | 3675008 A1 | 1/2020 |
|---|---|---|
| IN | 201841032794 A | 9/2019 |
| WO | 2020219134 A2 | 10/2020 |

OTHER PUBLICATIONS

International Search Report and Written Opinion received in International Application No. PCT/US2021/056865, mailed on Nov. 10, 2021 (pp. 1-8).

(Continued)

*Primary Examiner* — Shahid A Alam
(74) *Attorney, Agent, or Firm* — Volpe Koenig (57) ABSTRACT

Disclosed herein is a method implemented by a task mining engine. The task mining engine is stored as processor executable code on a memory. The processor executable code is executed by a processor that is communicatively coupled to the memory. The method includes receiving recorded tasks identifying user activity with respect to a computing environment and clustering the recorded user tasks into steps by processing and scoring each recorded user task. The method also includes extracting step sequences that identify similar combinations or repeated combinations of the steps to mimic the user activity.

20 Claims, 5 Drawing Sheets

(51) Int. Cl.
   *G06F 9/48* (2006.01)
   *G06F 11/34* (2006.01)
   *G06F 16/28* (2019.01)
   *G06F 18/2113* (2023.01)
   *G06F 18/2321* (2023.01)
   *G06N 3/008* (2023.01)

(52) U.S. Cl.
   CPC ........ *G06F 9/4831* (2013.01); *G06F 11/3438* (2013.01); *G06F 16/283* (2019.01); *G06F 16/285* (2019.01); *G06F 18/2113* (2023.01); *G06F 18/2321* (2023.01); *G06N 3/008* (2013.01)

(58) Field of Classification Search
   USPC .......................................................... 707/737
   See application file for complete search history.

(56) References Cited

U.S. PATENT DOCUMENTS

| | | | |
|---|---|---|---|
| 8,996,524 B2 | 3/2015 | Chaturvedi et al. | |
| 8,996,528 B1 | 3/2015 | Long et al. | |
| 9,555,544 B2 | 1/2017 | Bataller et al. | |
| 10,339,027 B2 | 7/2019 | Garcia et al. | |
| 10,354,225 B2 | 7/2019 | Sharma et al. | |
| 10,365,799 B2 | 7/2019 | Hosbettu et al. | |
| 10,613,838 B2 | 4/2020 | Kim et al. | |
| 11,894,996 B2 * | 2/2024 | Yadav | G06F 16/1748 |
| 2004/0160525 A1 * | 8/2004 | Kingetsu | H04N 23/6812 |
| | | | 348/E5.046 |
| 2006/0143513 A1 * | 6/2006 | Hillman | G06F 11/181 |
| | | | 714/13 |
| 2009/0327174 A1 * | 12/2009 | Honkala | G06F 16/1748 |
| | | | 706/12 |
| 2013/0055268 A1 | 2/2013 | Amershi et al. | |
| 2014/0280144 A1 | 9/2014 | Heit et al. | |
| 2014/0372482 A1 | 12/2014 | Martin et al. | |
| 2017/0353406 A1 | 12/2017 | Ramamurthy et al. | |
| 2018/0060793 A1 | 3/2018 | Sama et al. | |
| 2018/0374051 A1 | 12/2018 | Li et al. | |
| 2019/0197354 A1 * | 6/2019 | Law | G06F 16/489 |
| 2019/0324781 A1 | 10/2019 | Ramamurthy et al. | |
| 2019/0325029 A1 | 10/2019 | Gandhi et al. | |
| 2020/0027064 A1 * | 1/2020 | Mishra | G06F 16/9537 |
| 2020/0050983 A1 | 2/2020 | Balasubramanian et al. | |
| 2020/0206920 A1 | 7/2020 | Ma et al. | |
| 2020/0219033 A1 | 7/2020 | Smutko et al. | |
| 2020/0223061 A1 | 7/2020 | Han et al. | |
| 2021/0086354 A1 | 3/2021 | Berg et al. | |
| 2021/0109906 A1 | 4/2021 | Kuledge et al. | |

OTHER PUBLICATIONS

Supplementary European Search Report received in EP Application No. 21801404, completed Jul. 10, 2023 (2 pages).
Anonymous: "Cluster Analysis" Wikipedia, Jun. 5, 2020, XP093010540, retrieved from the internet: URL: https://en.wikipedia.org/w/index.php?title=Cluster_analysis&oldid=960961231, retrieved on Dec. 22, 2022 (22 pages).

* cited by examiner

TASK AND PROCESS MINING BY ROBOTIC PROCESS AUTOMATIONS ACROSS A COMPUTING ENVIRONMENT

CROSS-REFERENCE TO RELATED APPLICATIONS

This application is a continuation of U.S. application Ser. No. 17/229,085, filed Apr. 13, 2021, the contents of which are hereby incorporated by reference in their entirety.

BACKGROUND

The disclosure herein relates to the field of robotic process automation (RPA), and particularly to task and process mining by RPAs across a computing environment.

Conventional operating and software systems can provide data mining and process mining. Data mining includes computer science and statistic techniques for discovering patterns in large data sets. Process mining includes data science and process management techniques for analysis of operational processes based on event logs. A goal of data and process mining can be to support turning an event within conventional operating and software systems into insight and/or an action.

Yet, conventional operating and software systems at present have no way of providing an automation experience for data and process mining across distinct and separate operating and software systems. Thus, there is a need to integrate automation into data and process mining.

SUMMARY

According to one or more embodiments, a method implemented by a task mining engine is provided. The task mining engine is stored as processor executable code on a memory. The processor executable code is executed by at least one processor that is communicatively coupled to the memory. The method includes receiving one or more recorded tasks identifying user activity with respect to a computing environment and clustering the one or more recorded user tasks into one or more steps by processing and scoring each recorded user task. The method also includes extracting one or more step sequences that identify similar combinations or repeated combinations of the one or more steps to mimic the user activity.

According to one or more embodiments, the computing device embodiment above can be implemented as a method, an apparatus, a system, and/or a computer program product.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Disclosed herein is a task mining engine according to one or more embodiments. The task mining engine includes software and/or hardware that integrates robotic process automations (RPAs) into a computing environment. More particularly, the task mining engine implements task and process mining by RPAs across computing/software/hardware systems of a computing environment.

In general, task mining engine uses artificial intelligence to monitor, evaluate, and automate user activity. The user activity can be considered steps, actions, and/or tasks performed by a user. In this regard, the artificial intelligence seeks to identify and analyze (e.g., monitor and evaluate) a start and end of any individual step (and/or tasks and actions therein) that a user takes within the computing environment regardless of which and how many computing/software/hardware systems are engaged. Then, the steps/actions/tasks are automated by sequencing to generate code (e.g., robots/RPAs/scripts) that performs the user monitored and evaluated activity.

On a more granular level, monitoring can be considered a data phase or input phase where the artificial intelligence aims to capture steps, actions, and/or tasks that users perform. In turn, the artificial intelligence records data in real-time, receives/acquires data set of recordings, or utilizes a combination thereof to perform this capture.

Evaluating can be a main phase of the task mining engine that achieves an understanding of the user actions. In part, this main phase includes clustering (e.g., categorizing tasks/actions into steps and clustering the steps) to determine if automation 'makes sense.' That is, clustering can include categorizing an individuals' tasks and/or actions together in some meaningful way to produce clusters, such as a step. In another part, this main phase includes extracting from the clusters (e.g., sequence extractions within and across the clusters) to determine one or more sequences. In this way, the artificial intelligence takes the individual actions/tasks, which have been grouped together in some meaningful way, and identifies sequences of actions/tasks that are meaningful. Further, the artificial intelligence takes the individual steps and identifies sequences of steps that are meaningful.

Automating can be considered an output phase where the artificial intelligence aims to generate code (e.g., robots/RPA/scripts). The robots/RPA/scripts are tangible results that can operate automatically and independently.

The task mining engine can be implemented in the computing environment through a combination of hardware and software (e.g., processor executable code that is necessarily rooted in the hardware). The task mining engine, when implemented, can provide a specific configuring and tooling robotic process automation method for RPA mining techniques that manipulates input data, robotic processes, and the like.

In an example implementation, an embodiment of the specific configuring and tooling robotic process automation method ("the method") by the task mining engine includes receiving one or more recorded tasks identifying user activity with respect to a computing environment. The method includes clustering the one or more recorded user tasks into one or more steps by processing and scoring each recorded user task. The method includes extracting one or more step sequences and/or one or more task sequences to mimic the user activity. The method further includes outputting an automation code based on the one or more step sequences (e.g., and/or the one or more task sequences) that when executed automatically perform the user activity. Thus, the specific configuring and tooling robotic process automation method of the task mining engine involves a multi-step data manipulation of data (e.g., captured steps, actions, and/or tasks), robotic processes, interface components, and configurations in connection with the computing environment. The technical effects and benefits of the task mining engine include providing an automation experience to users via the integration detailed herein.

Figure 1:
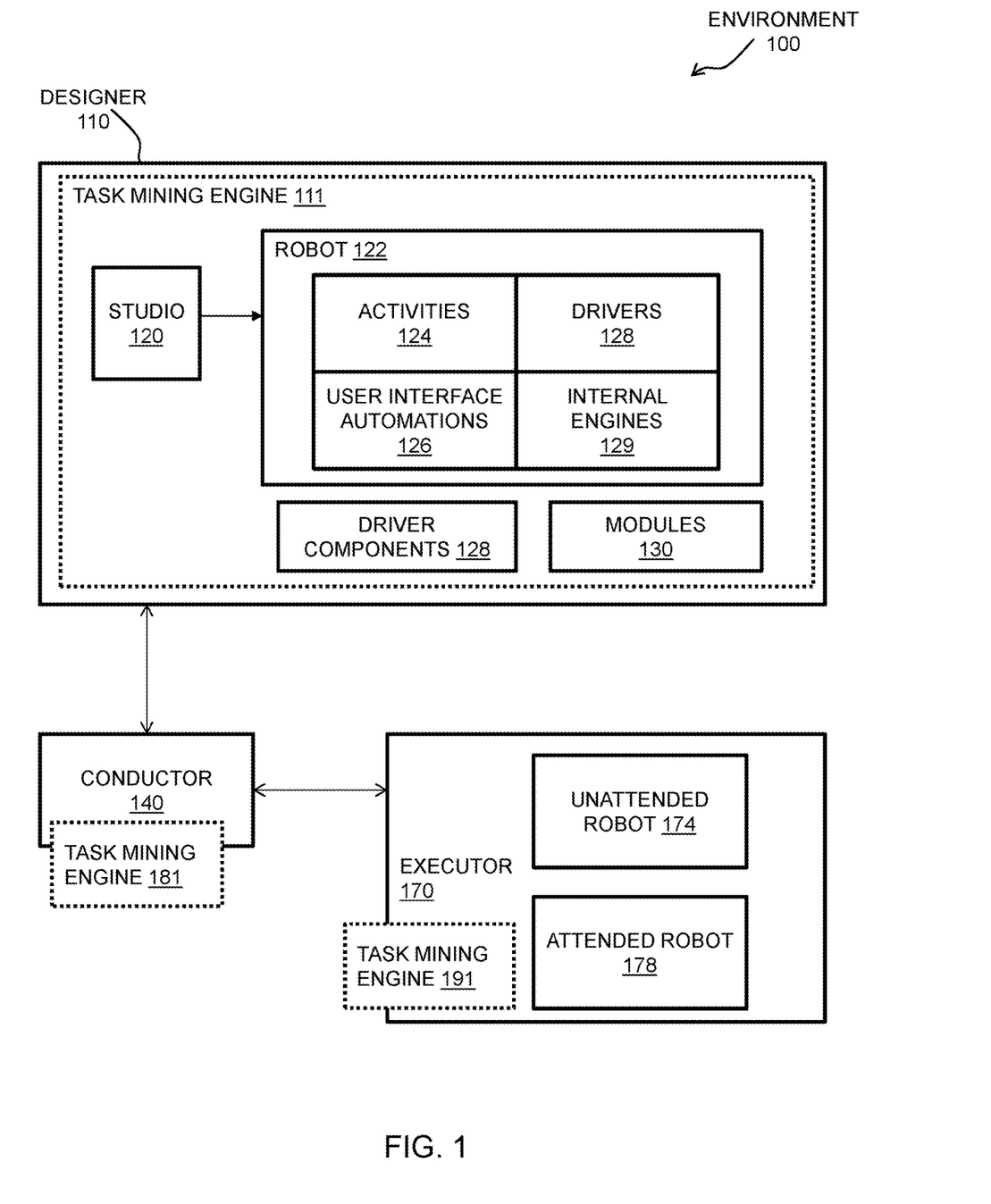
FIG. 1 depicts an environment illustrating development, design, operation, and/or execution of robotic process automations (RPAs) according to one or more embodiments.

FIG. 1 depicts an environment 100 (e.g., computing environment) illustrating development, design, operation, and/or execution of robotic process automations (RPAs) according to one or more embodiments. The environment 100 can be a design and deployment computing platform that includes one or more components. Note that while a single block is shown for each of the one or more components of the environment 100, that single block is representative of one or more of that component.

As shown, the environment 100 can include a designer 110 that further includes a task mining engine 111. The task mining engine 111 can include a studio component or module 120 that produces one or more robots (e.g., a robot 122) that perform one or more activities 124 and/or provide one or more user interface (UI) automations 126 using one or more drivers 128 and/or internal engines 129. The robot 122 may also engage with other driver components 131 and modules 132 within the designer 110 as well. Further, the environment 100 can include a conductor 140 and an executor 170, which can download/acquire/transmit the robot 122 so that the robot 122 can be provided in the environment 100 as an unattended robot 174 and an attended robot 178 of the executor 170.

The designer 110, the conductor 140, and the executor 170 are representative of computing devices, computing apparatuses, and/or computing systems, which comprise hardware, software, or a combination thereof. The designer 110, the conductor 140, and the executor 170, and any software thereon (e.g., the task mining engine 111) are configured to interact with a user or an operator to receive inputs and provide outputs. In an example, the executor 170 can be or implement mobile computing and/or mobile device environments.

According to one or more embodiments, the designer 110 can be referred to as a studio platform, a development platform, and/or an online platform. The designer 110 can include one or more engines (e.g., the task mining engine 111), development environments (e.g., the studio 120), or the like and can be configured to generate code, instructions, commands, or the like for a robot (e.g., the one or more robots 122, the unattended robots 174, and the attended robots 178) to perform or automate one or more workflows (e.g., the one or more activities 124 and/or provide the one or more UI automations 126).

The task mining engine 111, generally, is software and/or hardware that implements robotic process automation, such as the specific configuring and tooling robotic process automation method described herein. In this regard, the task mining engine 111 is detailed as a dotted box to illustrate a scalability and a portability of the task mining engine 111 within the environment 100. For example, the task mining engine can be implemented as separate instances throughout the environment 100, as shown by the task mining engines 181 and 191.

Generally, the task mining engine 111 implements machine learning and/or an artificial intelligence algorithm therein. The machine learning and/or the artificial intelligence algorithms operate with respect to hardware, using data (e.g., user actions), to train a machine, build models, and predict outcomes. According to one or more embodiments, the data can be on-going recorded data, currently collected data, historical data, or other data. The machine operates as a controller associated with the hardware and trains to include an analysis and correlation of the data collected. The model is built on the data by physical hardware and/or software modeling, algorithmic modeling, and/or the like so that the data (or subsets thereof) is represented and processed. In some aspects, building of the model is part of self-training operations by the machine. The model can be configured to model the operation of hardware and/or the data to predict the outcome that may be achieved by the hardware. Thus, for the task mining engine 111 to operate with respect to the hardware, using the data, to train the machine, build the model, and predict the outcomes 440, the machine learning and/or the artificial intelligence algorithms therein can include neural networks. In general, a neural network is a network or circuit of neurons, or in a modern sense, an artificial neural network (ANN), composed of artificial neurons or nodes or cells.

For example, an ANN involves a network of processing elements (artificial neurons) which can exhibit complex global behavior, determined by the connections between the processing elements and element parameters. These connections of the network or circuit of neurons are modeled as weights. A positive weight reflects an excitatory connection, while negative values mean inhibitory connections. Inputs are modified by a weight and summed using a linear combination. An activation function may control the amplitude of the output. For example, an acceptable range of output is usually between 0 and 1, or it could be −1 and 1. In most cases, the ANN is an adaptive system that changes its structure based on external or internal information that flows through the network.

In more practical terms, neural networks are non-linear statistical data modeling or decision-making tools that can be used to model complex relationships between inputs and outputs or to find patterns in data. Thus, ANNs may be used for predictive modeling and adaptive control applications, while being trained via a dataset. Note that self-learning resulting from experience can occur within ANNs, which can derive conclusions from a complex and seemingly unrelated set of information. The utility of artificial neural network models lies in the fact that they can be used to infer a function from observations and also to use it. Unsupervised neural networks can also be used to learn representations of the input that capture the salient characteristics of the input distribution, and more recently, deep learning algorithms, which can implicitly learn the distribution function of the observed data. Learning in neural networks is particularly useful in applications where the complexity of the data (e.g., the user actions) or the resulting tasks/steps/sequences/workflows makes the design of such functions by hand impractical.

Neural networks can be used in different fields. Thus, for the task mining engine 111, the machine learning and/or the artificial intelligence algorithms therein can include neural networks that are divided generally according to tasks to which they are applied. These divisions tend to fall within the following categories: regression analysis (e.g., function approximation) including time series prediction and modeling; classification including pattern and sequence recognition; novelty detection and sequential decision making; data processing including filtering; clustering; blind signal separation, and compression. For example, Application areas of ANNs include nonlinear system identification and control (vehicle control, process control), game-playing and decision making (backgammon, chess, racing), pattern recognition (radar systems, face identification, object recognition), sequence recognition (gesture, speech, handwritten text recognition), medical diagnosis and treatment, financial applications, data mining (or knowledge discovery in databases, "KDD"), visualization and e-mail spam filtering.

According to one or more embodiments, the neural network can implement a long short-term memory neural network architecture, a convolutional neural network (CNN) architecture, or other the like. The neural network can be configurable with respect to a number of layers, a number of connections (e.g., encoder/decoder connections), a regularization technique (e.g., dropout); and an optimization feature.

The long short-term memory neural network architecture includes feedback connections and can process single data points (e.g., such as images or screen shots), along with entire sequences of data (e.g., such as typing, speaking, and/or application switching). A unit of the long short-term memory neural network architecture can be composed of a cell, an input gate, an output gate, and a forget gate, where the cell remembers values over arbitrary time intervals and the gates regulate a flow of information into and out of the cell.

The CNN architecture is a shared-weight architecture with translation invariance characteristics where each neuron in one layer is connected to all neurons in the next layer. The regularization technique of the CNN architecture can take advantage of the hierarchical pattern in data and assemble more complex patterns using smaller and simpler patterns. If the neural network implements the CNN architecture, other configurable aspects of the architecture can include a number of filters at each stage, kernel size, a number of kernels per layer.

Further, in accordance with one or more embodiments, the task mining engine 111 can be part of a framework/mechanism (e.g., the environment 100) that automatically implements codes and designs the robot 122 within the studio 120. The task mining engine 111 can also enable developers and/or orchestrators (e.g., a user or operator) to code, program, and/or design the robot 122, such as through the studio 120. In an embodiment, the studio 120 can provide application integration, along with automating of third-party applications, administrative information technology (IT) tasks, and/or business IT processes.

The robot 122 (and the unattended robots 174 and the attended robots 178) may be an application, applet, script, or the like that may perform and/or automate one or more workflows (e.g., represented in part by the one or more activities 124 and/or provide the one or more UI automations 126). A workflow may include, but are not limited to, task sequences, flowcharts, Finite State Machines (FSMs), global exception handlers, UI transparents, or the like, along with any steps, actions, and/or tasks that users perform. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like. UI transparents can be software operations to an underlying operating system (OS) or hardware. Non-limiting examples of operations that can be accomplished by one or more workflows may be one or more of performing log-ins, filling a form, information technology (IT) management, or the like. To run a workflow for UI automation, the robot 122 may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

According to one or more embodiments, at development, the robot 122 can be produced at/by the designer 110 (e.g., the studio 120). Further, at deployment, the robot 122 may be managed, controlled, configured or the like at/by the conductor 140 (e.g., within the task mining engine 181). At deployment, the robot 122 may also be executed within the executor 170. In an example, a user input (e.g., a selection on a display) can be submitted by a user or an operator to the designer 110. From the selection, which the designer 110 may provide to the robot 122, the robot 122 may determine representative data of area(s) of a visual display (e.g., selected by the user or the operator). As part of RPAs, shapes (e.g., squares, rectangles, circles, polygons, freeform, or the like) in multiple dimensions may be utilized for UI robot development and runtime in relation to a computer vision (CV) operation and/or a machine learning (ML) model.

According to one or more embodiments, the UI automations 126 may be performed by the robot 122 using the drivers 128 therein, and the task mining engine 111 can perform activities using the modules 130 (e.g., CV activities module or engine). The driver components 132 may be utilized for UI automation by the robot 122 to get elements of a UI. The driver components 132 may include, but are not limited to, OS drivers, browser drivers, virtual machine drivers, enterprise drivers, and the like. In certain configurations, the modules 130 may be a driver used for UI automation. Further, any of these actions by the robot 122 can be implemented on a client (e.g., as the unattended robots 174 and the attended robots 178 of the executor 170).

The conductor 140 may instruct or command the robots 122, 174, and 178 or the executor 170 to execute or monitor a workflow in a mainframe, web, virtual machine, remote machine, virtual desktop, enterprise platform, online platform, desktop app(s), browser, or the like client, application, or program. The conductor 140 may act as a central or semi-central point to instruct or command one or more robots (e.g., the robots 122, 174, and 178) to automate a computing platform (e.g., the environment 100).

In accordance with one or more embodiments, the conductor 140 may be configured for provisioning, deployment, configuration, queueing, monitoring, logging, and/or providing interconnectivity. Provisioning may include creating and maintenance of connections or communication between the one or more robots, the executor 170, and conductor 140. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). The conductor 140 may provide interconnectivity by acting as the centralized point of communication for third-party solutions and/or applications.

According to one or more embodiments, the one or more robots and the executor 170 may be configured as the unattended robot 174 and/or the attended robot 178. For unattended operations, automation by the unattended robot 174 may be performed without inputs or control, such as by a third party. For attended operations, automation by the attended robot 178 may be performed by receiving input, commands, instructions, guidance, or the like, such as from a third party component. The unattended robot 174 and/or the attended robot 178 may run or execute on mobile computing or mobile device environments.

According to one or more embodiments, the one or more robots 122 and the executor 170 may be configured as execution agents that run workflows built in the designer 110. A commercial example of a robot(s) for UI or software automation is UiPath Robots™. In some embodiments, the one or more robots 122 and the executor 170 may install the Microsoft Windows® Service Control Manager (SCM)-managed service by default. As a result, such robots 122 can open interactive Windows® sessions under the local system account and have the rights of a Windows® service.

According to one or more embodiments, the one or more robots 122 and the executor 170 may be installed in a user mode. For example, the one or more robots 122 may have the same rights as a user under which a given robot is installed. This feature may also be available for High Density (HD) robots, which ensure full utilization of each machine at maximum performance such as in an HD environment.

According to one or more embodiments, the one or more robots 122 and the executor 170 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between the conductor 140 and execution hosts (i.e., the computing systems on which the one or more robots are executed). These services may be trusted with and manage the credentials for the one or more robots and the executor 170. User mode robot services may manage and monitor Windows® sessions and act as a proxy between conductor 140 and the execution hosts. User mode robot services may be trusted with and manage the credentials for robots. A Windows® application may automatically be launched if the SCM-managed robot service is not installed. In an example, the executor 170 may run given jobs under a Windows® session (e.g., they may execute workflows described herein) and may be aware of per-monitor dots per inch (DPI) settings. Agents may be Windows® Presentation Foundation (WPF) applications that display available jobs in a system tray window. Agents may be a client of the service. Agents may request to start or stop jobs and change settings. The command line may be a client of the service. The command line is a console application that can request to start jobs and waits for their output.

According to one or more embodiments, configurations where components of the one or more robots 122 and/or the executor 170 are split help developers, support users, and computing systems more easily run, identify, and track execution by each component. Special behaviors may be configured per component this way, such as setting up different firewall rules for the executor 170 and a service. The executor 170 may be aware of DPI settings per monitor in some embodiments. As a result, workflows may be executed at any DPI, regardless of the configuration of the computing system on which they were created. Projects from the designer 110 may also be independent of browser zoom level. For applications that are DPI-unaware or intentionally marked as unaware, DPI may be disabled in some embodiments.

Figure 2:
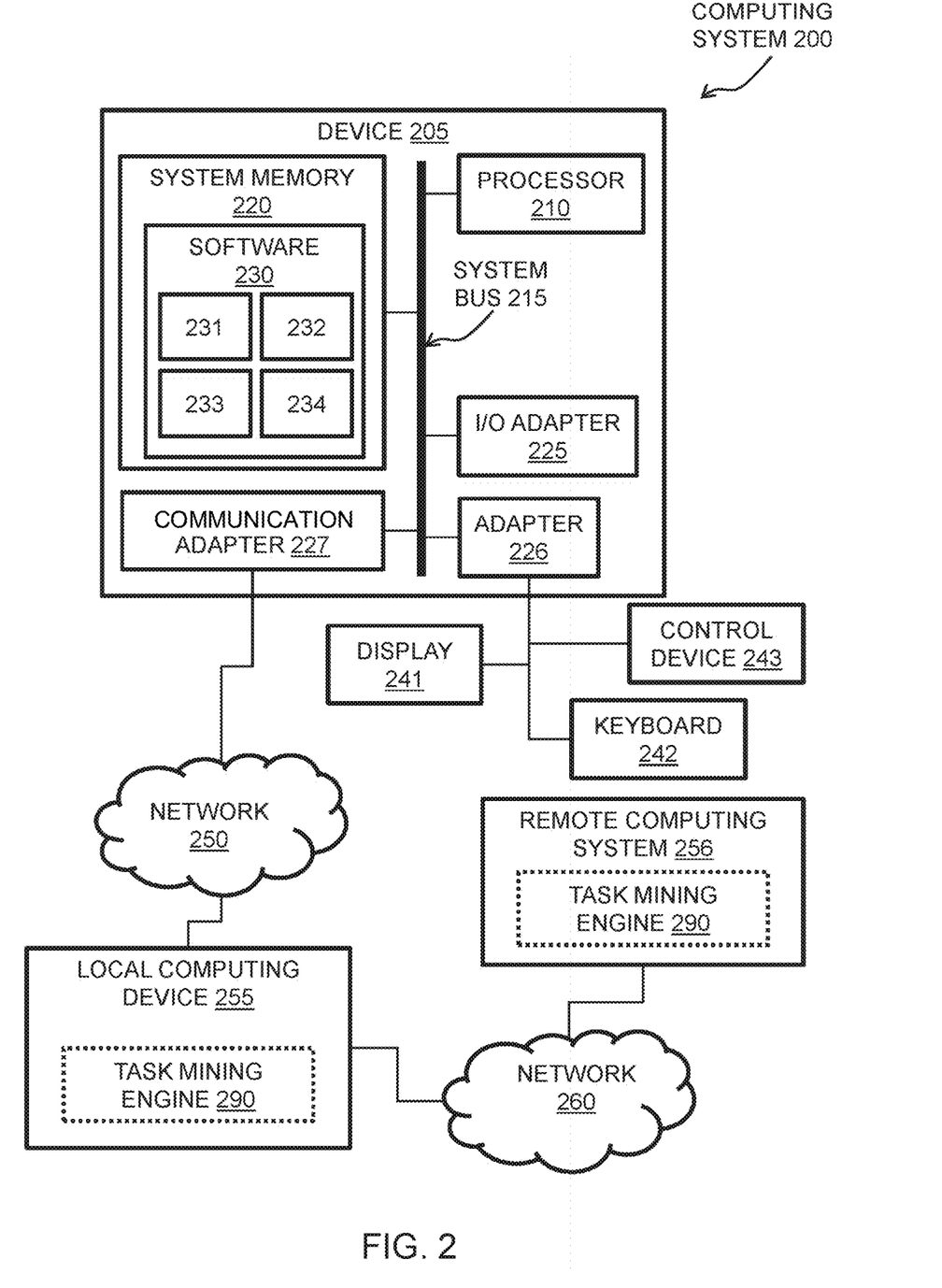
FIG. 2 is an illustration of a computing system according to one or more embodiments.

Turning now to FIG. 2, a computing system 200 is illustrated according to one or more embodiments. The computing system 200 can be representative of any computing device, computing apparatus, and/or computing environment, which comprise hardware, software, or a combination thereof (e.g., hardware supporting the task mining engine 111 of FIG. 1). Further, embodiments of the computing system 200 disclosed may include apparatuses, systems, methods, and/or computer program products at any possible technical detail level of integration.

The computing system 200 has a device 205 (e.g., the designer 110, the conductor 140, and the executor 170 of FIG. 1) with one or more central processing units (CPU(s)), which are collectively or generically referred to as a processor 210. The processor 210, also referred to as a processing circuit, is coupled via a system bus 215 to a system memory 220 and various other components. The computing system 200 and/or the device 205 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

The processor 210 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. The processor 210 may also have multiple processing cores, and at least some of the cores may be configured to perform specific functions. Multi-parallel processing may also be configured therein. In addition, the processor 210 may be a neuromorphic circuit that includes processing elements that mimic biological neurons.

The bus 215 (representative of one or more communication mechanism) is configured for communicating information or data to the processor 210, the system memory 220, and various other components, such as the adapters 225, 226, and 227.

Figure 3:
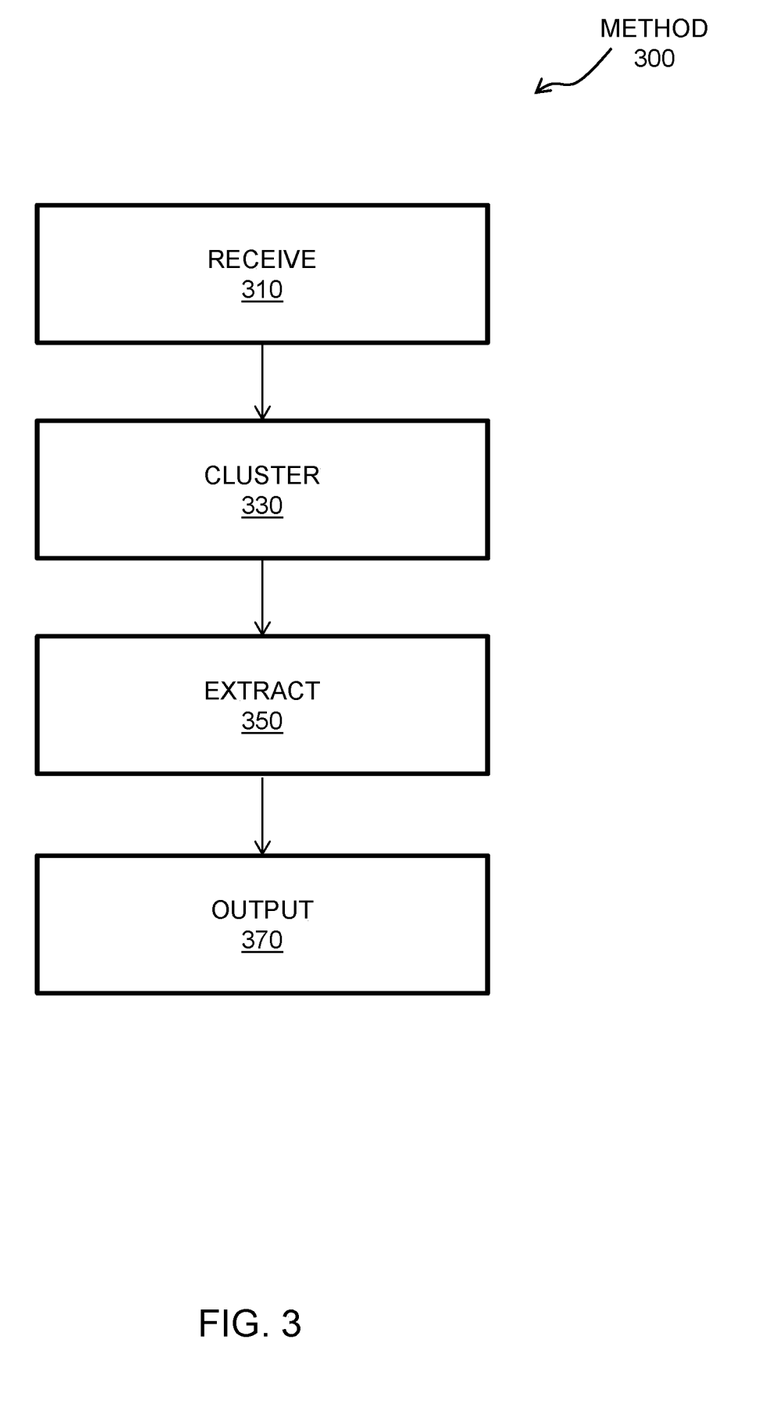
FIG. 3 is a block diagram illustrating a method executed within a computing environment according to one or more embodiments.
Figure 5:
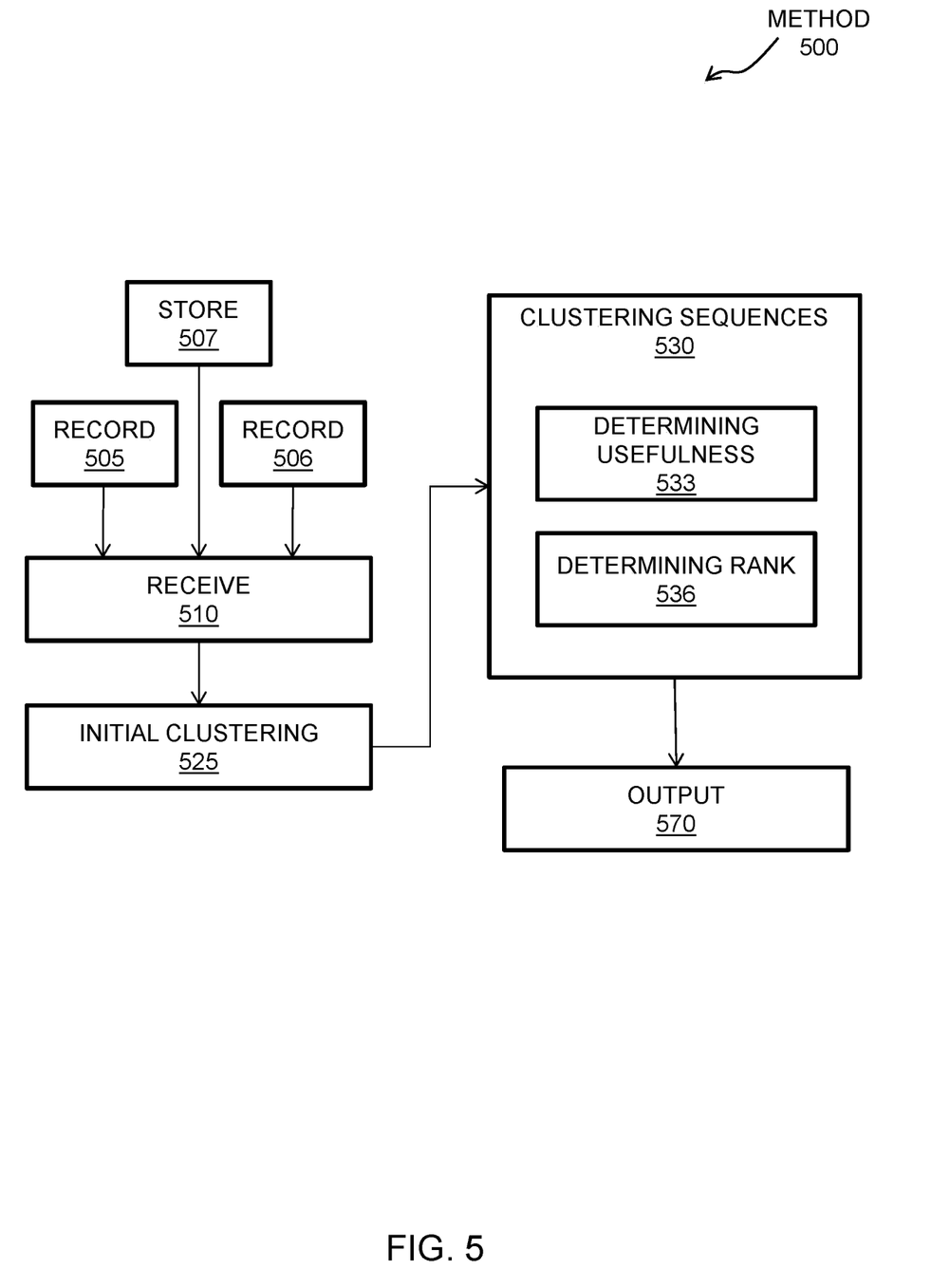
FIG. 5 is a block diagram illustrating a method executed within a computing environment according to one or more embodiments.

The system memory 220 is an example of a (non-transitory) computer readable storage medium, where software 230 can be stored as software components, modules, engines, instructions, or the like for execution by the processor 210 to cause the device 205 to operate, such as described herein with reference to FIGS. 3 and 5. The system memory 220 can include any combination of a read only memory (ROM), a random access memory (RAM), internal or external Flash memory, embedded static-RAM (SRAM), solid-state memory, cache, static storage such as a magnetic or optical disk, or any other types of volatile or non-volatile memory. Non-transitory computer readable storage mediums may be any media that can be accessed by the processor 210 and may include volatile media, non-volatile media, or the like. For example, the ROM is coupled to the system bus 215 and may include a basic input/output system (BIOS), which controls certain basic functions of the device 205, and the RAM is read-write memory coupled to the system bus 215 for use by the processors 210. Non-transitory computer readable storage mediums can include any media that is removable, non-removable, or the like.

In connection with FIG. 1, the software 230 of FIG. 2 can be representative of interface engine 111 and components therein, such that the memory 220 and the processor 210 can logically design/configure/provide the robot 122, which further performs one or more activities 124 and/or provides one or more user interface (UI) automations 126 using one or more driver components 128 and/or internal engines 129. The software 230 of FIG. 2 can also be representative of an operating system for the device 205 for the computing system 200.

According to one or more embodiments, the software 230 can be configured in hardware, software, or a hybrid implementation. The software 230 can be composed of modules that are in operative communication with one another, and to pass information or instructions. The software 230 can further include custom modules to perform application specific processes or derivatives thereof, such that the computing system 200 may include additional functionality. For example, according to one or more embodiments, the software 230 may be configured to store information, instructions, commands, or data to be executed or processed by the processor 210 to enable operations 231, 232, 233, and 234.

For instance, the task mining engine 111 of FIG. 1 implemented as the software 230 of FIG. 2 can provide the specific configuring and tooling robotic process automation method to the computing system 200, so that the computing system 200 can receive (231) one or more recorded tasks identifying user activity with respect to a computing environment, cluster (232) the one or more recorded user tasks into one or more steps by processing and scoring each recorded user task, extract (233) one or more step sequences and/or one or more task sequences to mimic the user activity, and output (234) an automation code based on the one or more step sequences (e.g., and/or the one or more task sequences) that when executed automatically perform the user activity.

Further, the modules of the software 210 can be implemented as a hardware circuit comprising custom very large scale integration (VLSI) circuits or gate arrays, off-the-shelf semiconductors such as logic chips, transistors, or other discrete components, in programmable hardware devices (e.g., field programmable gate arrays, programmable array logic, programmable logic devices), graphics processing units, or the like. The modules of the software 210 can be at least partially implemented in software for execution by various types of processors. According to one or more embodiments, an identified unit of executable code may include one or more physical or logical blocks of computer instructions that may, for instance, be organized as an object, procedure, routine, subroutine, or function. Executables of an identified module co-located or stored in different locations such that, when joined logically together, comprise the module. A module of executable code may be a single instruction, one or more data structures, one or more data sets, a plurality of instructions, or the like distributed over several different code segments, among different programs, across several memory devices, or the like. Operational or functional data may be identified and illustrated herein within modules of the software 210 and may be embodied in a suitable form and organized within any suitable type of data structure.

With respect to the adapters 225, 226, and 227 of FIG. 2, the device 205 can particularly include an input/output (I/O) adapter 225, a device adapter 226, and a communications adapter 227. According to one or more embodiments, the I/O adapter 225 can be configured as a small computer system interface (SCSI), in view of frequency division multiple access (FDMA) single carrier FDMA (SC-FDMA), time division multiple access (TDMA), code division multiple access (CDMA), orthogonal frequency-division multiplexing (OFDM), orthogonal frequency-division multiple access (OFDMA), global system for mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication. The device adapter 226 interconnects input/output devices to the system bus 215, such as a display 241, a keyboard 242, a control device 243, or the like (e.g., a camera, a speaker, etc.). The communications adapter 226 interconnects the system bus 215 with a network 250, which may be an outside network, enabling the device 205 to communicate data with other such devices (e.g., such as the local computing device 255 and, further, the remote computing system 256 through the network 260). In one embodiment, the adapters 225, 226, and 227 may be connected to one or more I/O buses that are connected to the system bus 215 via an intermediate bus bridge. Suitable I/O buses for connecting peripheral devices such as hard disk controllers, network adapters, and graphics adapters typically include common protocols, such as the Peripheral Component Interconnect (PCI).

Examples of the display 241 can include, but are not limited to, a plasma, a liquid crystal display (LCD), a light emitting diode (LED), a field emission display (FED), an organic light emitting diode (OLED) display, a flexible OLED display, a flexible substrate display, a projection display, a 4K display, a high definition (HD) display, a Retina© display, an in-plane switching (IPS) display or the like. The display 241 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

The keyboard 242 and the control device 243, such as a computer mouse, a touchpad, a touch screen, a keypad, or the like, may be further coupled to the system bus 215 for input to the device 205. In addition, one or more inputs may be provided to the computing system 200 remotely via another computing system (e.g., the local computing device 255 and/or the remote computing system 256) in communication therewith, or the device 205 may operate autonomously.

According to one or more embodiments, the functionality of the device 205 with respect to the software 210 can also be implemented on the local computing device 255 and/or the remote computing system 256, as represented by separate instances of the task mining engine 290.

Turning now to FIG. 3, a block diagram illustrating a method 300 executed within a computing environment (e.g., the environment 100 of FIG. 1) according to one or more embodiments. More particularly, the method 300 is an example implementation of task and process mining by RPAs across the environment 100 by the task mining engine 191.

The process flow 300 begins at block 310, where the task mining engine 191 receives/monitors one or more recorded tasks identifying user activity with respect to the environment 100 (e.g., records data in real-time, receives/acquires data set of recordings, or utilizes a combination thereof). The one or more recorded tasks can include actions a user takes at the executor 170 during the user activity. The one or more recorded tasks can also include unstructured data recorded in real time (e.g., by the task mining engine 191 from the environment 100) while the user activity is occurring. The one or more recorded tasks can be received from external sources to the executor 170, such as a database or repository. According to one or more embodiments, the task mining engine 191 may utilize the unattended robot 174 to capture one or more activities 124 (e.g., workflows), as steps, actions, and/or tasks.

At block 330, the task mining engine 191 clusters the one or more recorded user tasks into one or more steps. In an embodiment, the task mining engine 191 can process and scoring each recorded user task, for example, such as by utilizing a centroid-based or K-means clustering algorithm to cluster the one or more recorded user tasks. Generally, a K-means clustering algorithm can include is a vector quantization method that partitions n observations into k clusters, such that each observation belongs to a cluster with a nearest mean (e.g., cluster centroid serving as a prototype for that cluster). One or more other clustering algorithm can be used in lieu of or in combination with the K-means clustering algorithm, such as connectivity-based clustering (e.g., hierarchical clustering), distribution-based clustering, density-based clustering, and grid-based clustering.

At block 350, the task mining engine 191 extracts one or more step sequences to mimic the user activity. The one or more step sequences identify similar combinations or repeated combinations of the one or more steps. The task mining engine 191 can also extract one or more task sequences. The one or more task sequences identify an automation of the user activity from within the one or more steps.

According to one or more embodiments, through the operations of blocks 330 and 350, the task mining engine 191 provides a technical effect and benefit of understanding the user actions by clustering (e.g., categorizing tasks/actions into steps and clustering the steps) to determine if automation 'makes sense' and by extracting from the clusters (e.g., sequence extractions within and across the clusters) to determine one or more sequences. In this way, the task mining engine 191 takes the individual actions/tasks, which have been grouped together in some meaningful way, and identifies sequences of actions/tasks that are meaningful. Further, the task mining engine 191 can take the individual steps and identifies sequences of steps that are meaningful.

At block 370, the task mining engine 191 outputs an automation code based on the one or more step sequences that when executed automatically perform the user activity. The automation code can also be based on the one or more task sequences. According to one or more embodiments, the automation code can be implemented as another instance of the unattended robot 174 (e.g., or any robot 122) to operate automatically and independently. Thus, the task mining engine 191 provides an automation experience via the automation code to users.

Figure 4:
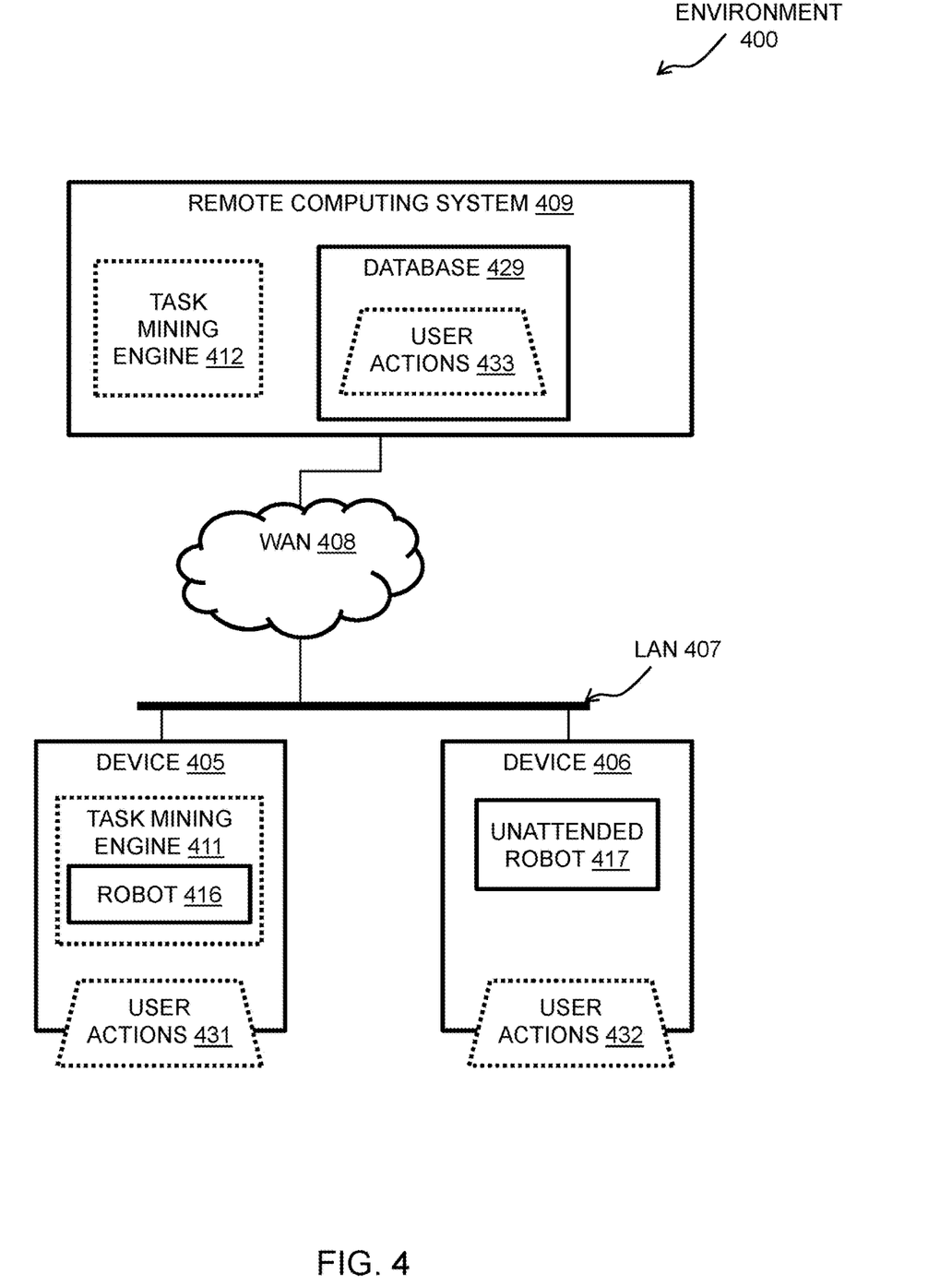
FIG. 4 is an illustration of a computing environment according to one or more embodiments.

FIG. 4 depicts an environment 400 (e.g., computing environment) illustrating development, design, operation, and/or execution of robotic process automations (RPAs) according to one or more embodiments. Generally, the environment 400 illustrates a task mining project where data is recorded, clustered, and mined to produce discrete tasks in an output. For brevity and ease of explanation, components of the environment 400 that are similar to those of FIGS. 1-2 are not redefined. Note that while a single block is shown for each of the one or more components of the environment 100, that single block is representative of one or more of that component.

As shown, the environment 100 can include one or more devices 405 and 406 (e.g., the executor 170 of FIG. 1 or the device 205 of FIG. 2) connected to a local area network (LAN) 407 that further connects to a wide area network (WAN) 408 (e.g., the networks 250 and 260 of FIG. 2), where one or more remote computing systems 409 operate (e.g., the remote computing system 256 of FIG. 2). Within the environment, instances of a task mining engine 411 and 412 (e.g., the task mining engines 111, 181, and 191 of FIG. 1 or the software 230 of FIG. 2) execute and/or interact with one or more robots 416 and 417 (e.g., the robots 122, 174, and 178 of FIG. 1) and the database 429 (e.g., the conductor 140 of FIG. 1 or the system memory 220 of FIG. 2) to receive/monitor/record user actions 431, 432, and 433.

User actions 431, 432, and 433 can include any user input or activity with respect to a workflow, as described herein. For instance, a user utilizes the device 206 (e.g., a digital phone) receives insurance claim telephone calls. The user utilizes the device 205 (e.g., a desktop computer) to enter details of the insurance claim telephone calls. In turn, the user actions 432 can include answering, transferring, ending, recording, holding operations with respect to a call, while the user action 431 can include enter customer information, claim information, filling web forms, emails to adjusters or other coworkers. Further, the user actions 433 can include manager approvals of claims or the like.

An example operation of the environment is described with respect to FIG. 4, which illustrates a block diagram of the method 500 according to one or more embodiments. More particularly, the method 500 is an example implementation of task and process mining by the task mining engines 411 and 412 and the robots 416 and 417 across the environment 400.

The method 500 begins at block 505, where the robot 416 records user actions 431 of a first user in real-time. Additionally, at block 506, the unattended robot 417 records user actions 432 of a second user in real-time (e.g., or the first user who is now using a different device). The user actions 431 and 432 can be stored locally with the respective devices 405 and 406 and/or communicated to the database 429. As previously recording have been performed for each user, the user actions 433 (e.g., unstructured data recorded in real time) can be presently stored (block 407) on the database 429. In any case, the user actions 431, 432, and 433 collectively represent one or more individual steps, actions, and/or tasks that any user takes in a particular UI of a screen (e.g., web form actions in a certain web form, a certain application window, etc.). For instance, a user action can include a single click of a cursor within a user interface, typing by a user, navigation through scrolling, drag and dropping, etc. The user actions 431, 432, and 433 can also be considered sub-tasks that combine into one or more tasks as described herein. In a particular example, in the context of a customer service call, user actions 431 can include actions with respect to completing Forms 1 and 2, user actions 432 can include actions with respect to receiving a customer call, and user actions 433 can include actions with respect to manager approvals.

According to one or more embodiments, the task mining engine 411 can use optical character recognition (OCR) mechanism from a screen of the device 205 and a words-to-vector artificial intelligence algorithm to create a representation of the individual words based on an appearance on the screen. That is, the task mining engine 411 generates a representation of the user actions 431 (note that the representation can include a number of different qualities, like temporal information). The OCR mechanism can include any conversion of images (e.g., a screen shot) of text into machine-encoded text. The words-to-vector artificial intelligence algorithm can include any model group (e.g., two-layer neural networks) used to produce word embeddings to reconstruct linguistic contexts of words (e.g., provide coded representation of an action or step). Additionally, or alternatively, an open-source library for unsupervised topic modeling and natural language processing, such as GENSIM and/or Scikit-Learn, using modern statistical machine learning, can be used as well. In effect, the task mining engine 411 combines the OCR mechanism and the words-to-vector artificial intelligence algorithm to create a single representation for an entire screen.

At block 510, where the task mining engine 411 or the task mining engine 412 receives the user actions 431, 432, and 433 (e.g., aggregates the data with respect to the customer service call). For ease of explanation, the remainder of the method 500 is described from the perspective of the task mining engine 411, though the task mining engine 412 can duplicate the operations herein. The task mining engine 411 can receive the user actions 432 and 433 by pull requests or the like across the LAN 407 or the WAN 408. The one or more recorded tasks can also include unstructured data recorded in real time (e.g., by the task mining engine 191 from the environment 100 of FIG. 1) while the user activity is occurring. The one or more recorded tasks can be received from external sources as well, such as a database or repository. According to one or more embodiments, the task mining engine 411 may utilize the unattended robot 417 to capture one or more activities (e.g., workflows), as steps, actions, and/or tasks.

At block 525, the task mining engine 411 clusters the user actions 431, 432, and 433 to determine whether actions can be considered the same (e.g., a user types a comment associated with the customer service call, and then types same comment into a comment box of the Form 1). As a general note, the clustering of block 525 can be considered a clustering of individual steps/screens shots. Further, a sequence of the user actions 431, 432, and 433 can be considered in this clustering operation by the task mining engine 411 (e.g., clicking before scrolling by the first user vs. scrolling before clicking; sequences can look at various activities and see whether the activities achieve a same outcome). In this way, one or more user tasks can be identified through an initial clustering from the user actions 431, 432, and 433 (e.g., combine sub-tasks combine into the one or more tasks; individual actions are clustered), and the clustering of the user actions 431, 432, and 433 into the one or more user tasks can be carried further by combining the one or more user tasks into one or more steps. Furthermore, the initial clustering of block 525 clusters the user actions 431, 432, and 433 to find the one or more steps, such that an entire cluster is a type of step that a user can take. The initial clustering can also determine how many different steps are represented, as well as determines "how to determine the how many." In this latter case, the initial clustering executes a number of different clustering, scores the clustering, and measure how good each execution went to determine a quality metric (e.g., to maximize an amount of structure in a log given the clustering that is produced).

Initial clustering is a not trivial operation that provides a technical effect and benefit of balancing between being too specific (causing user action matches to be missed) and being too general (causing dissimilar user actions to be grouped). To achieve this balance, the task mining engine 411 can implement one or more clustering algorithms, as needed (e.g., a clustering algorithm can be chosen with respect to an interface screen where the user actions occurred). Examples of one or more clustering algorithms include, but are not limited to, a centroid-based or K-means clustering, a connectivity-based clustering (e.g., hierarchical clustering), a distribution-based clustering, density-based clustering, and grid-based clustering.

According to one or more embodiment, the task mining engine 411 first groups/clusters the user actions 431, 432, and 433 into which kind of UI the user actions 431, 432, and 433 were performed on (e.g., the web form actions in the certain web form, the certain application window, etc.). For example, words that are close together on a screen tend to be given similar representations (via the words-to-vector artificial intelligence algorithm, the Scikit-Learn, and/or the GENSIM). An assumption is that different screen types have different words, and the words on different screens are given different representations, allowing the task mining engine 411 to distinguish the screens. In some cases, two screens with similar words get similar representation and can be grouped/clustered similarly by the, for example, K-means clustering. Other examples of clustering to analyze the representations include using image data, text size, text font, information from the selectors (e.g., the application that is being run on the screen), individual pages, etc.

According to one or more embodiment, the task mining engine 411 can set one or more parameters of the clustering algorithms. The task mining engine 411 can score groupings/clusters based on accuracy and feedback, the scores to determine optimal parameter settings. For example, the K-means clustering can find a best grouping based on a number of clusters by executing a number of times over a different number of clusters and using a score (e.g., a silhouette score and/or a temporal score) to find the best parameters. The silhouette score evaluates cluster quality in terms of how well the user actions 431, 432, and 433 are clustered. The silhouette score can be calculated for each sample of different clusters, along with determining whether the silhouette score the same score for each cluster and/or whether each cluster runs more than once. The temporal score can be in lieu of or in addition to the silhouette score, so that temporal information of the representation can be accounted for when determining the best parameters.

At block 530, the task mining engine 411 clusters sequences. As a general note, the clustering of block 530 can include a temporal element where the clustered steps/screens shots are further clustered with respect to time (e.g., using time stamps, the task mining engine 411 determines how close in time different steps/screens shots occur). According to one or more embodiments, the task mining engine 411 can use same clustering algorithms as in block 530 and/or one or more different clustering algorithms. In an example, the task mining engine 411 executes a sequence extraction algorithm (e.g., an alpha algorithm) that implements symbolic clustering and/or sequential pattern mining. Sequential pattern mining can include extracting statistically relevant patterns between the user actions 431, 432, and 433 and/or the clusters generated at block 525 delivered in a sequence, such that the task mining engine 411 can build efficient databases and indexes for sequence information, extract frequently occurring patterns, compare sequences for similarity, and recover missing sequence members.

For example, clustering sequences or second clustering can be considered an operation for sequence extraction or identifying sequences from the user actions 431, 432, and 433 and/or the clusters generated at block 525. In general, clusters sequences is inclusive of extracting one or more step sequences and/or one or more task sequences to mimic the user activity as described herein. With respect to the method 500, clustering sequences can have two aspects: determining usefulness at sub-block 533 and determining rank at sub-block 536.

At sub-block 533, the task mining engine 411 determines usefulness. That is, a technical problem that the task mining engine 411 solves is determining what it means for a sequence of actions to be useful. The task mining engine 411 does not want to capture a user, for example, looking for 'stuff' online and does want sequences that occur more often than a random chance. Random chance or randomness is an apparent or actual lack of pattern or predictability, such that one or more of the user actions 431, 432, and 433 have no order or do not follow an intelligible pattern or combination (e.g., probability distribution can be determined based on a frequency of the one or more of the user actions 431, 432, and 433 over time). In essence, the task mining engine 411 seeks to determine a good way to identify 'how to extract useful sequences.'

For example, the task mining engine 411 can extract from the generated clusters task or sequence examples that are different but similar enough that they should be combined. Further, the task mining engine 411 can determine variations from these task or sequence examples and determine whether the variations are different enough that the variations should be separated. In an embodiment, the task mining engine 411 can utilize one or more correlation detectors, such as any Poisson process statistical models where all actions are assumed to be random and a likelihood of sequence occurrence is computed. Examples of correlation detectors of the task mining engine 411 that use statistical models compute p values and correlations within step sequences. In this way, the task mining engine 411 can determine how often do the variations appear together, as well as how far apart. Some relatively infrequent processes are not useful, such as searching for a song about once an hour. The correlation detectors of the task mining engine 411 recognize actions that are repeated many times more strongly and can account for some variance where sequences that have a different order but achieve the same result (thus, are recognized as being the same). Further, the correlation detector of the task mining engine 411 can look at, in addition to order, a set of actions in any order, so the correlation detector can recognize actions that are not strictly in some sequence.

At sub-block 536, the task mining engine 411 determines rank. That is, a technical problem that the task mining engine 411 solves is determining a rank of each that was determined to be useful. In other words, the task mining engine 411 ranks extracted tasks and sequences to determine which ones are the most interesting (e.g., setting a relationship between extracted tasks and sequences such that, for any two items, one is "ranked higher than" or "more interesting than" the second other). Rank can be an alphanumerical value across a scale (e.g., a number from 1 to 10). Note that interestingness identifies a likelihood that a task or a sequence is relevant to a business objection of the user, such that any of the user actions 431, 432, and 433 over time can be identified as important and used to identify other user actions. The task mining engine 411 can employ a statistical model (that is different than correlation detector described herein) that looks at the entire sequence as a unified chunk and computes statistics (e.g., ranks) based on variations of a stochastic model (e.g., a hidden Markov model). Note that the operations sub-blocks 536 and 536 can be independent or combined, based on the computational cost to the environment 400.

According to one or more embodiments, blocks 525 and 530 can alternatively or in addition to the operations herein include an analyzing aspect for analyzing a sequence to determine separate, stand-alone actions and/or sub-tasks. That is, because there is no guarantee that two tasks will be totally separate, the task mining engine 411 may be required to extract sub-tasks from a task as their own separate tasks. In this way, the task mining engine 411 identifies that sub-tasks are part of larger tasks and that the extraction of the sub-tasks is useful.

Note that the task mining engine 411 compute fractions of task steps, which can also be assigned to another task as part of a pair of tasks. In this regard, if there is a significant overlap for one task, but not the other, the first task is likely to be part of the second task. Significant overlap can include when a fraction of actions contained in first task are in the other task with respect to a dynamic threshold set on a sliding scale. The task mining engine 411 can adjust the dynamic between 0% to 100%, such as articulating between 85% and 65%. Thus, the task mining engine 411 can use the dynamic threshold for each pair of tasks, generate a directed graph, and use the directed graph to group all combinations and/or sub-combinations of tasks.

According to one or more embodiments, block 525 and 530 can alternatively or in addition to the operations herein include a repeated sequence extraction aspect. The repeated sequence extraction aspect seeks repeated actions in the clusters, as these repeated action may include potentially automatable processes/workflows. The repeated sequence extraction aspect enable various levels of specificity with clustering so that the task mining engine 411 can be flexible in using machine learning and/or the artificial intelligence algorithms. In this regard, the task mining engine 411 can leverage deep neural networks to predict future actions from a log of a current sequence. For example, the machine learning and/or the artificial intelligence algorithms can learn from the user actions 431, 432, and 433 and the cluster how to predict future action, then use these prediction to discover particular sub-tasks/tasks/sequences (e.g., to predict sequences that are performed more frequently and more accurately). In some cases, clustering may occur after the machine learning and/or the artificial intelligence algorithms operations, to solve the problem of the clustering being a processing bottleneck and to provide the benefit of learning sequences abstractly. Note other neural networks can be utilized.

The neural network operates to support implementation of the machine learning and/or the artificial intelligence algorithms (e.g., as implemented by the task mining engine 411)

described herein. The neural network can be implemented in hardware, as well as software. In an example operation, an input layer of the neural network receives the inputs, such as the user actions 431, 432, and 433, the neural network encodes these inputs (e.g., utilizing any portion of the user actions 431, 432, and 433 and predictions produced by the task mining engine 111) to produce a latent representation or data coding. The latent representation includes one or more intermediary data representations derived from the plurality of inputs. According to one or more embodiments, the latent representation is generated by an element-wise activation function (e.g., a sigmoid function or a rectified linear unit) of the task mining engine 111. The inputs are provided to a hidden layer, which performs a processing to exhibit complex global behavior, determined by the connections between the processing elements and element parameters. Thus, the transition between the input and hidden layers can be considered an encoder stage that takes the inputs and transfers it to a deep neural network (within the hidden layers) to learn some smaller representation of the input (e.g., a resulting latent representation). The deep neural network can be a CNN, a long short-term memory neural network, a fully connected neural network, or combination thereof. This encoding provides a dimensionality reduction of the inputs. Dimensionality reduction is a process of reducing the number of random variables (of the inputs) under consideration by obtaining a set of principal variables. For instance, dimensionality reduction can be a feature extraction that transforms data (e.g., the inputs) from a high-dimensional space (e.g., more than 10 dimensions) to a lower-dimensional space (e.g., 2-3 dimensions). The technical effects and benefits of dimensionality reduction include reducing time and storage space requirements for the user actions 431, 432, and 433, improving visualization of the user actions 431, 432, and 433, and improving parameter interpretation for machine learning. This data transformation can be linear or nonlinear. The operations of receiving and encoding can be considered a data preparation portion of the multi-step data manipulation by the task mining engine 111. Further, the neural network decodes the latent representation. The decoding stage takes the encoder output (e.g., the resulting latent representation) and attempts to reconstruct some form of the inputs using another deep neural network. In this regard, nodes of the latent representation are combined to produce an output in the output layer. That is, the output layer reconstructs the inputs on a reduced dimension but without the interferences, artifacts, noise, or the like.

Returning to the method 500, as indicated herein with respect to block 530, the task mining engine 411 generates ranked sequences from the initial clustering of block 525 and the user actions 431, 432, and 433 that account for usefulness of those sequences. At block 570, the task mining engine 411 outputs an automation code based on the ranked sequences that when executed automatically perform the user activity. According to one or more embodiments, the automation code can be implemented as another instance of the unattended robot 417 (e.g., or any robot 416) to operate automatically and independently. For example, the unattended robot 417 can record the customer service call, which the robot 416 automatically sends an email upon completion of form 2 to a manager for approval. Thus, the task mining engine 191 provides an automation experience via the automation code to users.

According to one or more embodiments, one or more technical effects, benefits, and advantages of task mining engines described herein are to identify a start and an end of a task. In this way, any unstructured data that comes into an environment can be aggregated from one or more sources sent to a database of the environment (e.g., the cloud). Further, client versions of the task mining engines can record data as well. With the aggregated and recorded data, the task mining engines execute clustering to analyze the data and determine tasks/steps/sequences, which are fixed with a score and automated as RPAs based on the corresponding score.

According to one or more embodiments, one or more task mining engines can also determine task variations. A task variation can include when two or more tasks achieve a same result (e.g., completing a set of forms), while one of the two or more tasks more efficient (e.g., completing the set of forms in a particular order). Task variations may also be indicative of other aspects (e.g., such as completing a hotel booking for a customer, and a task variation includes adding a package to the hotel booking). The task mining engines can, in turn, automate a most efficient task of the task variations.

For instance, the task mining engines receive action set (e.g., for a task/workflow/process), assign a signature to each action therein, and generate traces of the task based on sequences within the action set to determine which order actions therein occurred. Generally, there is one signature for each action type to provide an indication of a sequence order, and grouping the action sets based on these signatures can provide the variations within the action set. That is, the trace changes when the sequence order changes. If an action A (e.g., user action assigned signature A) occurred 5 out of 6 times before action B (e.g., user action assigned signature B), then action A would come before action B in a trace. As the task mining engines are already aware that these variations of the same workflow/process, the task mining engines look at the average number of steps, a time each variation takes, etc. to determine efficiency.

In an example, a user completes Forms 1 and 2 twenty-five times, with each time Form 2 receiving manager approval (e.g., Form 1 has a first signature, Form 2 has a second signature, and manager approval has a third signature). If Form 1 was completed 21 out of 25 times before Form 2 and manager approval, then Form 1 would come before Form 2 in a first trace. For the remaining 4 times, a second trace identifies a sequence order that includes the user completing Form 2 first and manager approval occurring while the user completes Form 1. When the task mining engines identify that the second trace is shorter than the first trace, due to manager approval occurring in parallel to the completion of Form 1, the task mining engines can determine that the second trace is more efficient. Thus, the second trace can be suggested, automated, and implemented over the first trace.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks are shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. For instance, for any of the methods and processes described herein, the steps recited may be performed out of sequence in any order and sub-steps not explicitly described or shown may be performed. When referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic. In addition, "coupled" or "operatively coupled" may mean that objects are linked but may have zero or more intermediate objects between the linked objects. Also, any combination of the disclosed features/elements may be used in one or more embodiments.

In addition, the methods and processes described herein may be implemented in a computer program, software, and/or firmware (e.g., a computer program product) incorporated in a computer-readable medium for execution by a computer or processor. That is, the computer program product may include a computer readable storage medium (or media) having computer readable program instructions thereon for causing a controller, processor, or the like to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick.

The computer readable program instructions described herein can be communicated and/or downloaded to respective controllers, processors, or the like from an apparatus, device, computer, or external storage via a connection, for example, network communications. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method implemented by a task mining engine stored as processor executable code on a memory, the processor executable code being executed by at least one processor that is communicatively coupled to the memory, the method comprising:
   receiving, by the task mining engine from a computing environment, one or more recorded tasks comprising unstructured data recorded in real time and identifying user activity with respect to the computing environment;
   clustering, by the task mining engine, the one or more recorded tasks into one or more steps by processing and scoring according to a temporal element each recorded user task to determine a closeness in time for the one or more steps; and
   extracting, by one or more correlation detectors of the task mining engine, one or more task sequences that identify an automation of the user activity from within the one or more steps.

2. The method of claim 1 comprising:
   analyzing the one or more task sequences to determine separate, stand-alone user actions or sub-tasks.

3. The method of claim 1 comprising:
   determining usefulness for the one or more recorded tasks or the one or more task sequences based on occurrence more often than a random chance.

4. The method of claim 1, wherein the clustering comprises balancing between specificity and generality to maximize an amount of structure for the one or more steps.

5. The method of claim 1 comprising:
   outputting, by the task mining engine, an automation code based on the one or more task sequences that when executed automatically perform the user activity.

6. The method of claim 1 comprising:
extracting, by the task mining engine, one or more step sequences that identify similar combinations or repeated combinations of the one or more steps to mimic the user activity.

7. The method of claim 1, wherein each of the one or more recorded tasks comprises an action a user takes during the user activity.

8. The method of claim 1, wherein clustering the one or more recorded user tasks comprises an initial clustering operation that balances between being missing user action matches and grouping dissimilar user actions.

9. The method of claim 1, wherein the task mining engine determines rank for the one or more recorded tasks or one or more step sequences identifying interestingness.

10. The method of claim 1, wherein the unstructured data recorded in real time while the user activity is occurring by the task mining engine.

11. The method of claim 1, wherein the one or more correlation detectors of the task mining engine comprise a statistical model to compute p values and correlations within the one or more task sequences.

12. The method of claim 1, wherein the one or more correlation detectors of the task mining engine recognize repeated actions of the one or more task sequences and account for variance the one or more task sequences.

13. A system comprising:
a memory storing processor executable code for a task mining engine; and
at least one processor communicatively coupled to the memory and configured to execute the processor executable code to cause the system to perform;
receiving, by the task mining engine from a computing environment, one or more recorded tasks comprising unstructured data recorded in real time and identifying user activity with respect to the computing environment;
clustering, by the task mining engine, the one or more recorded tasks into one or more steps by processing and scoring according to a temporal element each recorded user task to determine a closeness in time for the one or more steps; and
extracting, by one or more correlation detectors of the task mining engine, one or more task sequences that identify an automation of the user activity from within the one or more steps.

14. The system of claim 13, wherein the at least one processor is configured to execute the processor executable code to cause the system to perform:
analyzing the one or more task sequences to determine separate, stand-alone user actions or sub-tasks.

15. The system of claim 13, wherein the at least one processor is configured to execute the processor executable code to cause the system to perform:
determining usefulness for the one or more recorded tasks or the one or more task sequences based on occurrence more often than a random chance.

16. The system of claim 13, wherein the clustering comprises balancing between specificity and generality to maximize an amount of structure for the one or more steps.

17. The system of claim 13, wherein the at least one processor is configured to execute the processor executable code to cause the system to perform:
outputting, by the task mining engine, an automation code based on the one or more task sequences that when executed automatically perform the user activity.

18. The system of claim 13, wherein the at least one processor is configured to execute the processor executable code to cause the system to perform:
extracting, by the task mining engine, one or more step sequences that identify similar combinations or repeated combinations of the one or more steps to mimic the user activity.

19. The system of claim 13, wherein each of the one or more recorded tasks comprises an action a user takes during the user activity.

20. The system of claim 13, wherein clustering the one or more recorded user tasks comprises an initial clustering operation that balances between being missing user action matches and grouping dissimilar user actions.

* * * * *